US012701548B2

(12) United States Patent
Saha et al.

(10) Patent No.: US 12,701,548 B2
(45) Date of Patent: Aug. 4, 2026

(54) PRE-PAGING FOR DEEP COVERAGE SCENARIOS

(71) Applicant: QUALCOMM Incorporated, San Diego, CA (US)

(72) Inventors: Chiranjib Saha, Lakeside, CA (US); Alberto Rico Alvarino, San Diego, CA (US); Umesh Phuyal, San Diego, CA (US); Le Liu, San Jose, CA (US); Bharat Shrestha, San Diego, CA (US); Xiao Feng Wang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 18/459,403

(22) Filed: Aug. 31, 2023

(65) Prior Publication Data

US 2025/0081160 A1 Mar. 6, 2025

(51) Int. Cl.
 *H04W 68/02* (2009.01)
 *H04W 76/20* (2018.01)
 *H04W 84/06* (2009.01)
(52) U.S. Cl.
 CPC ........... *H04W 68/02* (2013.01); *H04W 76/20* (2018.02); *H04W 84/06* (2013.01)
(58) Field of Classification Search
 CPC ... H04W 68/02; H04W 68/005; H04W 76/20; H04W 76/27; H04W 84/06
 See application file for complete search history.

(56) References Cited

U.S. PATENT DOCUMENTS

| | | | | |
|---|---|---|---|---|
| 2020/0275375 A1* | 8/2020 | Liu | .................. | H04W 52/0216 |
| 2022/0240222 A1* | 7/2022 | Youn | .................. | H04W 60/005 |
| 2022/0338159 A1* | 10/2022 | Phuyal | ................. | H04W 24/10 |
| 2022/0394667 A1* | 12/2022 | Berggren | ........... | H04W 68/005 |
| 2023/0379823 A1* | 11/2023 | Berggren | .......... | H04W 52/0235 |
| 2023/0397159 A1* | 12/2023 | Li | ..................... | H04W 52/0216 |
| 2023/0413379 A1* | 12/2023 | Jeon | .................. | H04W 72/232 |
| 2025/0016739 A1* | 1/2025 | Agiwal | ............. | H04W 52/0229 |
| 2025/0097811 A1* | 3/2025 | Yavuz | .................. | H04W 48/10 |
| 2025/0287429 A1* | 9/2025 | Shah | .................... | H04W 68/00 |

FOREIGN PATENT DOCUMENTS

WO 2022078696 A1 4/2022

OTHER PUBLICATIONS

International Search Report and Written Opinion—PCT/US2024/044270—ISA/EPO—Nov. 29, 2024.

* cited by examiner

*Primary Examiner* — Robert C Scheibel
(74) *Attorney, Agent, or Firm* — Patterson + Sheridan, L.L.P.

(57) ABSTRACT

Certain aspects of the present disclosure provide techniques for wireless communications at a network entity. The network entity is configured to transmit a legacy paging message to a user equipment via a first set of resources, and a pre-paging message to a user equipment via a second set of resources. The second set of resources is used if one or more conditions are met. The network entity can also perform one or more actions after transmitting the pre-paging message.

29 Claims, 12 Drawing Sheets

700

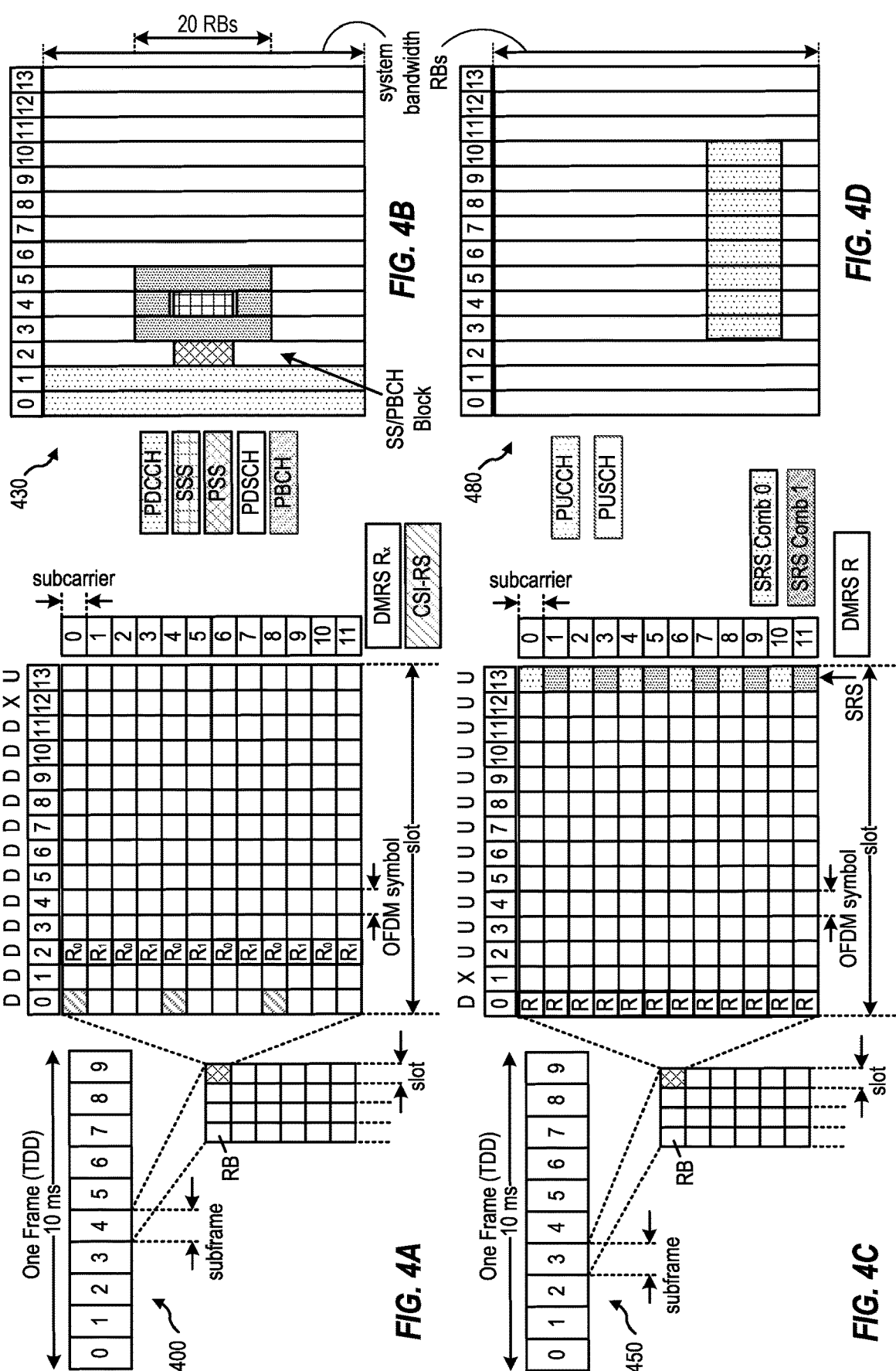

700

800

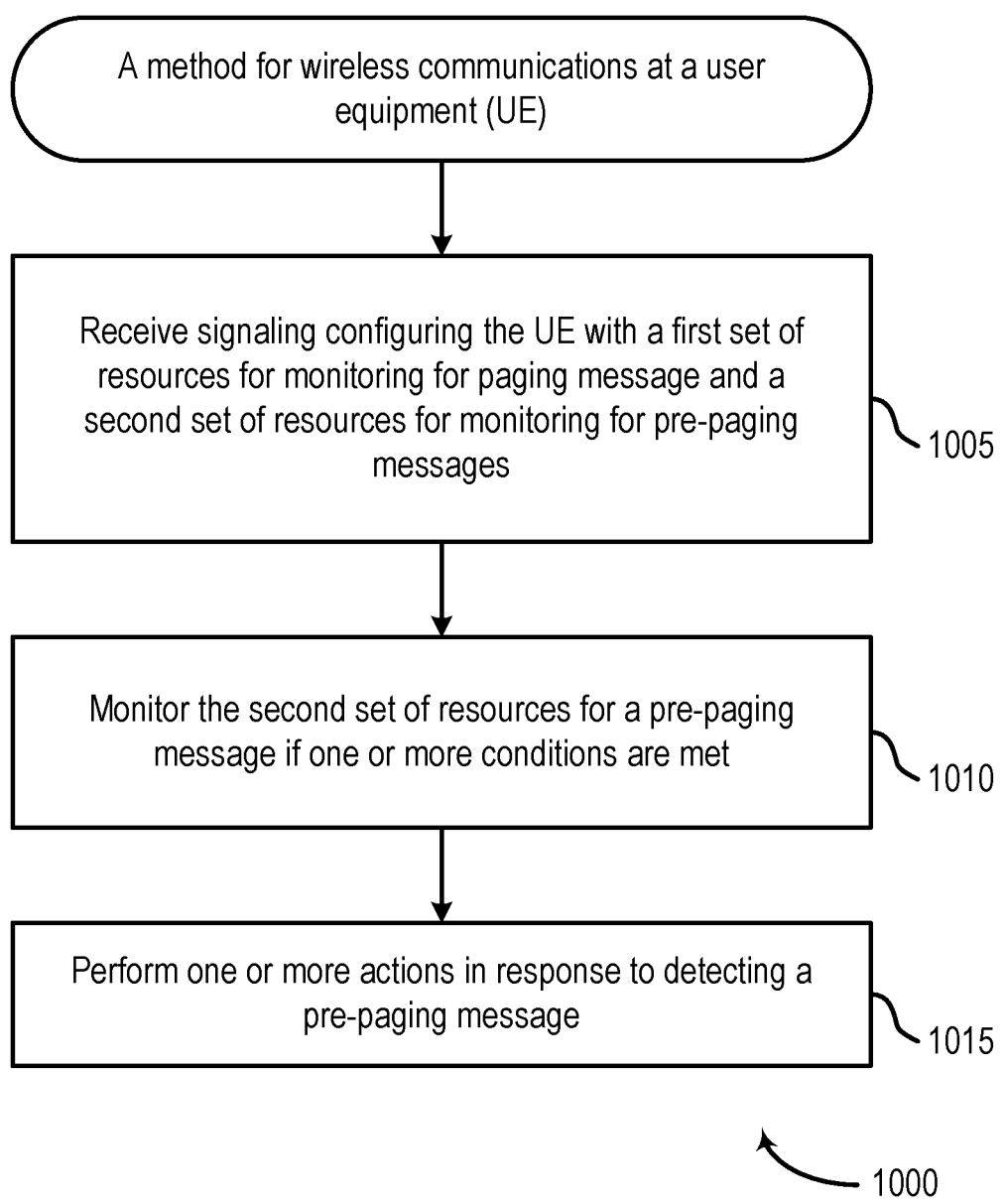

A method for wireless communications at a user equipment (UE)

Receive signaling configuring the UE with a first set of resources for monitoring for paging message and a second set of resources for monitoring for pre-paging messages

1005

Monitor the second set of resources for a pre-paging message if one or more conditions are met

1010

Perform one or more actions in response to detecting a pre-paging message

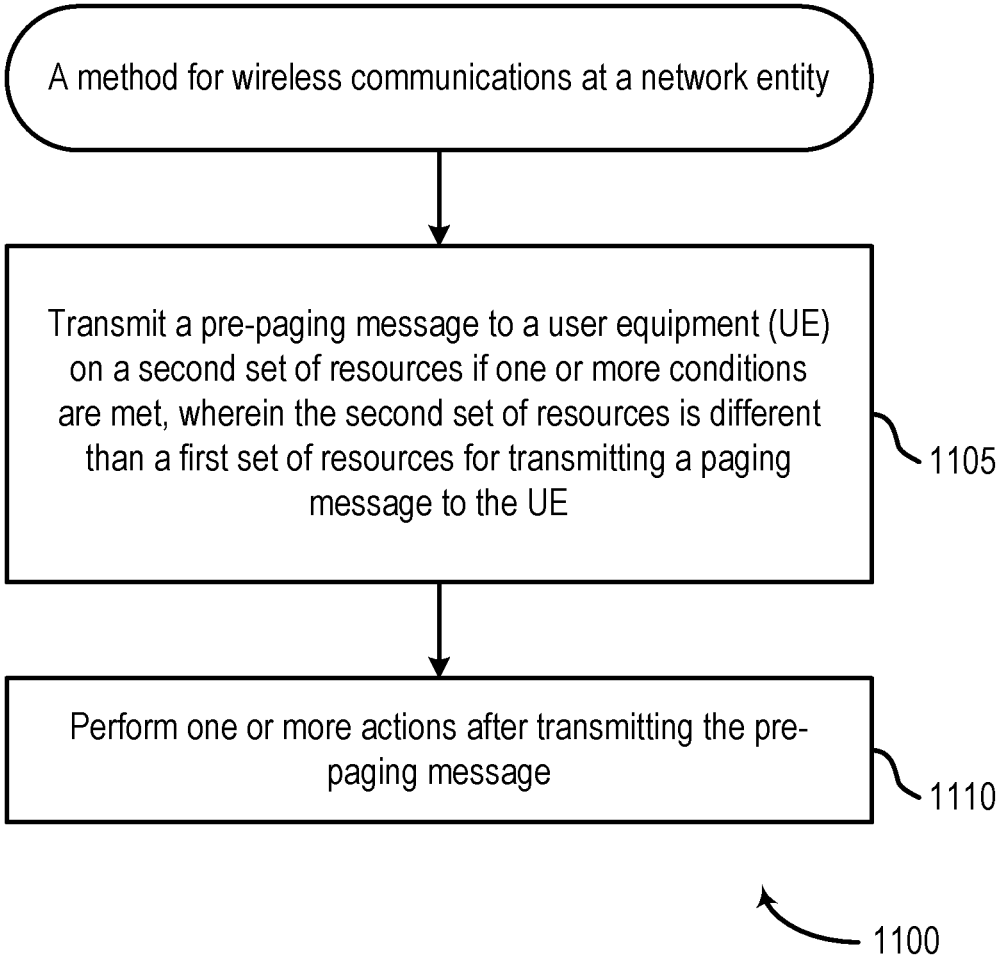

A method for wireless communications at a network entity

Transmit a pre-paging message to a user equipment (UE) on a second set of resources if one or more conditions are met, wherein the second set of resources is different than a first set of resources for transmitting a paging message to the UE — 1105

Perform one or more actions after transmitting the pre-paging message — 1110

PRE-PAGING FOR DEEP COVERAGE SCENARIOS

BACKGROUND

Field of the Disclosure

Aspects of the present disclosure relate to wireless communications, and more particularly, to techniques for reaching a user device located in a limited coverage zone of a wireless communications network.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment (UE). The method includes receiving signaling configuring the UE with a first set of resources for monitoring for paging message and a second set of resources for monitoring for pre-paging messages; monitoring the second set of resources for a pre-paging message if one or more conditions are met; and performing one or more actions in response to detecting a pre-paging message.

Another aspect provides a method for wireless communications at a network entity. The method includes transmitting a pre-paging message to a user equipment (UE) on a second set of resources if one or more conditions are met, wherein the second set of resources is different than a first set of resources for transmitting a paging message to the UE; and performing one or more actions after transmitting the pre-paging message.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIG. 10 depicts a method for wireless communications.

FIG. 11 depicts a method for wireless communications.

DETAILED DESCRIPTION

Aspects of the present disclosure provide apparatuses, methods, processing systems, and computer-readable mediums for reaching a user device located in a limited coverage zone of a wireless communications network, for example using a physical channel dedicated for pre-paging UEs located in a deep coverage zone of the wireless communications network.

A wireless communications network may need to page a UE located within the network, for a number of reasons. For example, the UE may be a target of a mobile terminated (MT) phone call. However, if the UE is unable to receive a strong enough signal, it may not detect the page from the network. The UE may be unable to receive a strong enough signal because it is located in a deep coverage zone, or because it is obstructed by some other physical barrier. As such, there are times when a UE may be unreachable by a network.

Aspects of the present disclosure provide for techniques that may help page a UE in deep coverage. For example, a network may pre-page a UE over a physical channel, if it is not able to page the UE first using legacy methods (e.g., involving a conventional paging channel). In aspects of the present disclosure, a UE can be configured to monitor for a legacy page over a first channel, and configured to monitor for a pre-page over a second channel. The UE can select which channel to monitor based on whether it is located in a normal coverage zone, or a deep coverage zone of the wireless communications network.

By configuring a second channel for a UE to receive a pre-paging signal from the network, a network may be able to alert a UE that the network is attempting to deliver information to it, which may prompt a user of the UE to move to a location within a normal coverage zone. After moving to the normal coverage zone, the network may be able to reach the UE with conventional paging and can deliver the information to the UE. Thus, pre-paging techniques allow for a UE to be reached even when outside of a normal coverage zone. As a result, aspects of the present disclosure may help improve coverage of a wireless communications network.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
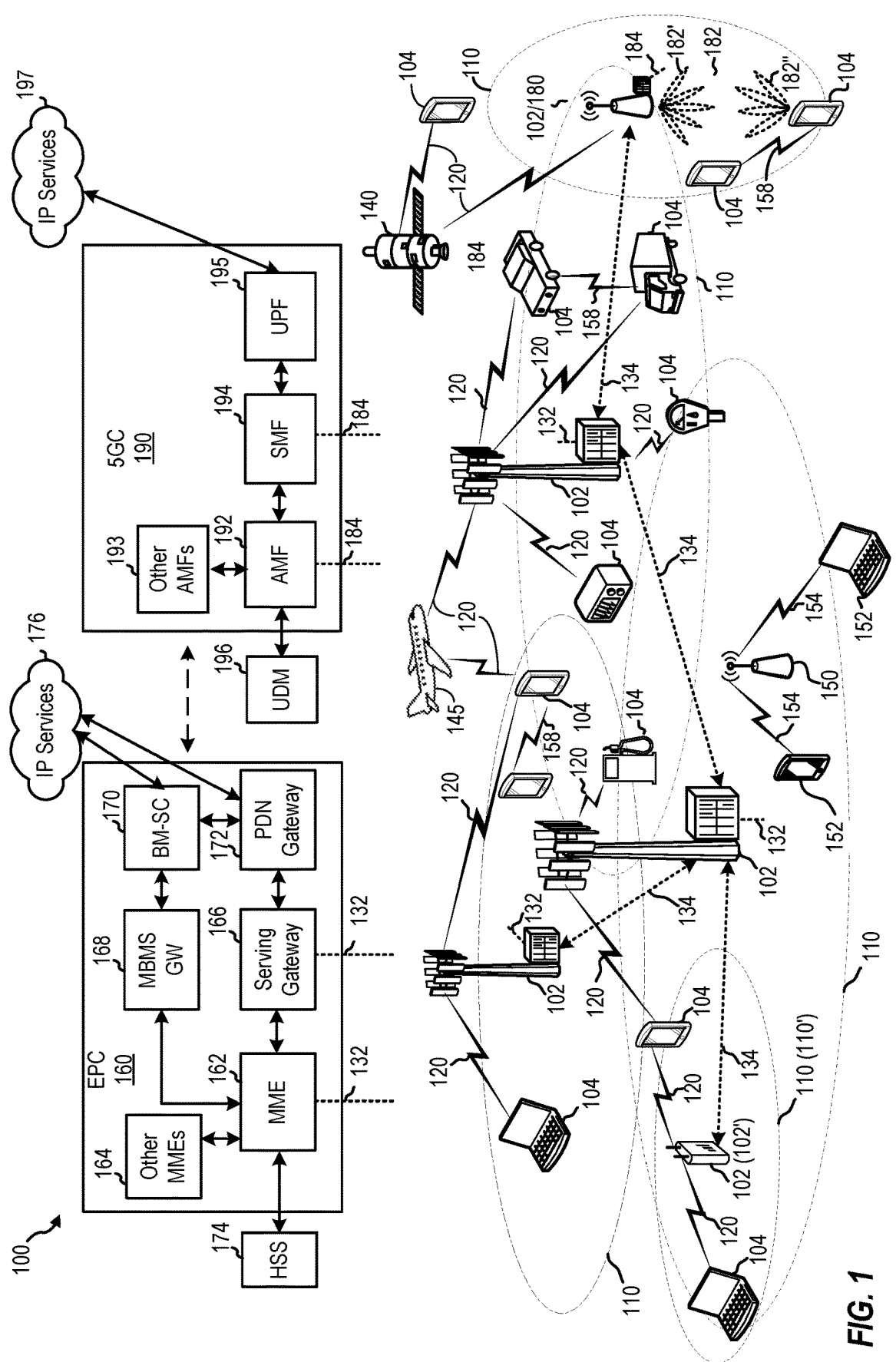
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipment.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
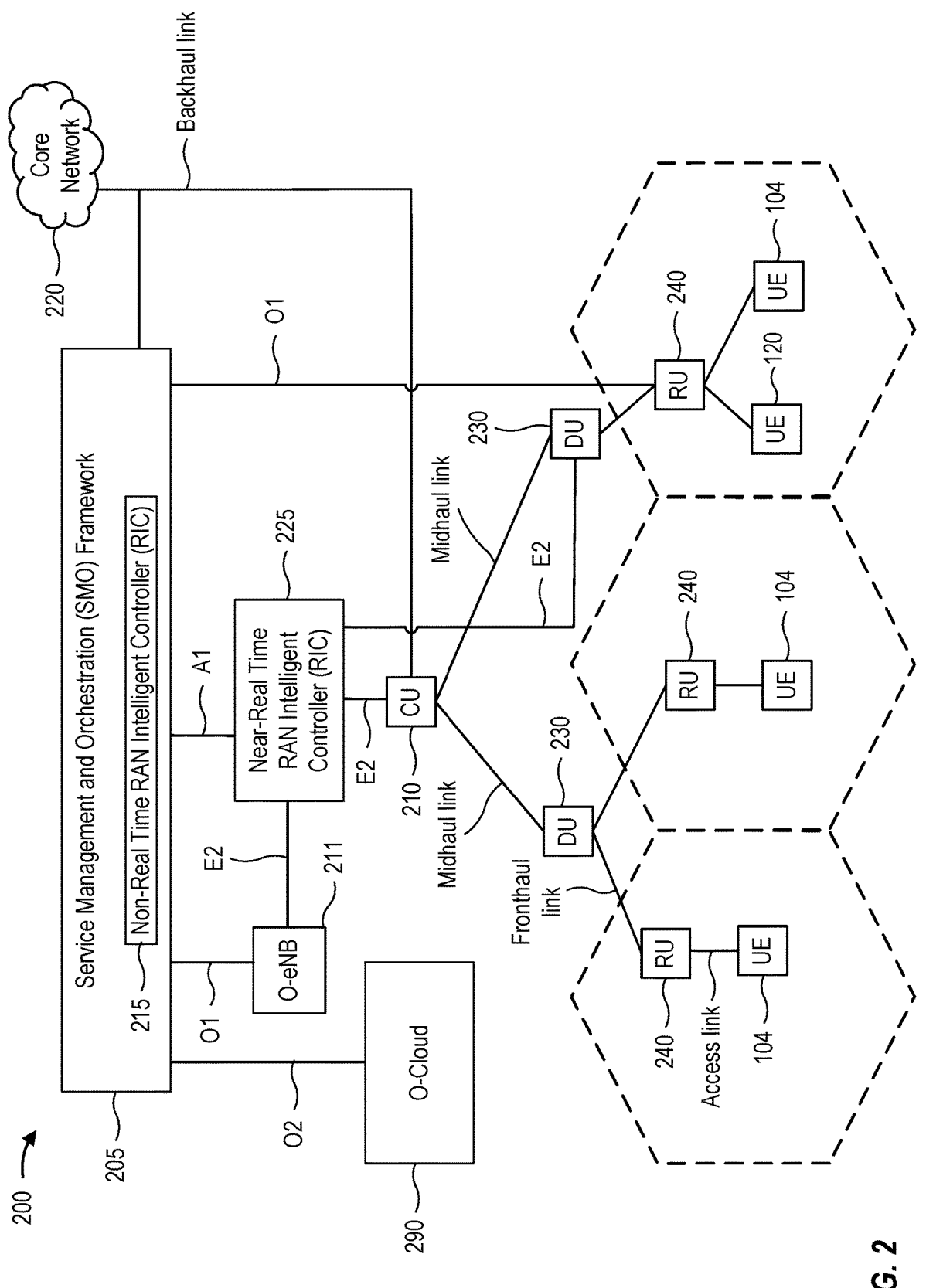
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHz-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52, 600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bi-directionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
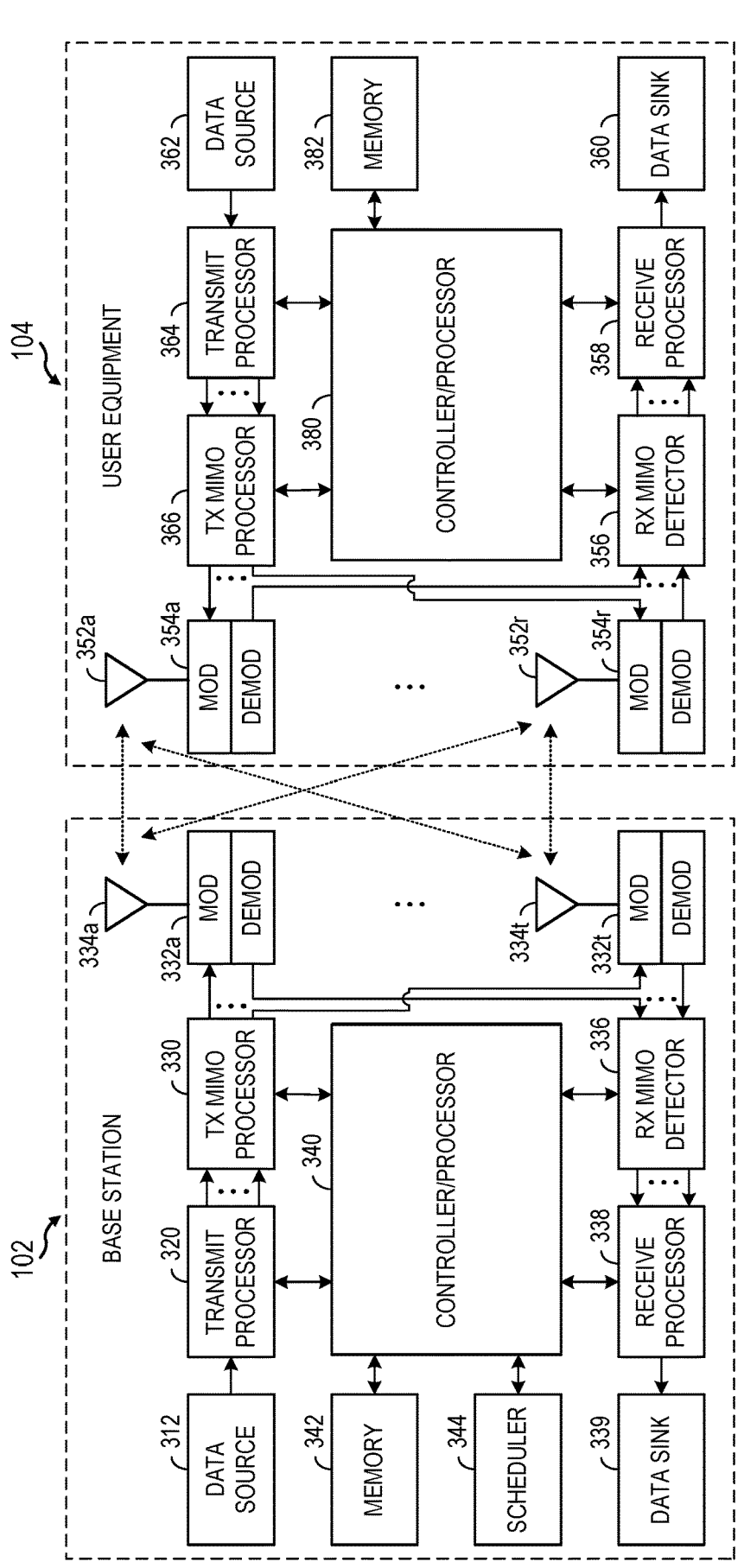
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2\mu$ slots/subframe. The subcarrier spacing and symbol length/duration are a function of the numerology. The subcarrier spacing may be equal to $24 \times 15$ kHz, where u is the numerology 0 to 6. As such, the numerology μ=0 has a subcarrier spacing of 15 kHz and the numerology μ=6 has a subcarrier spacing of 960 kHz. The symbol length/duration is inversely related to the subcarrier spacing. FIGS. 4A. 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview Non-Terrestrial Networks

Satellite-based NTNs may play a crucial role in providing connectivity with global coverage including rural and off-shore areas, which are fundamental for supporting important use cases. A NTN generally refers to a network, or segment of networks, using RF resources on board a satellite. NTN signaling may be regenerative (with on-board NTN processing) or transparent (e.g., where the satellite sends back to Earth what it receives with only amplification and a shift from uplink to downlink frequency).

Figures 5A, 5B:
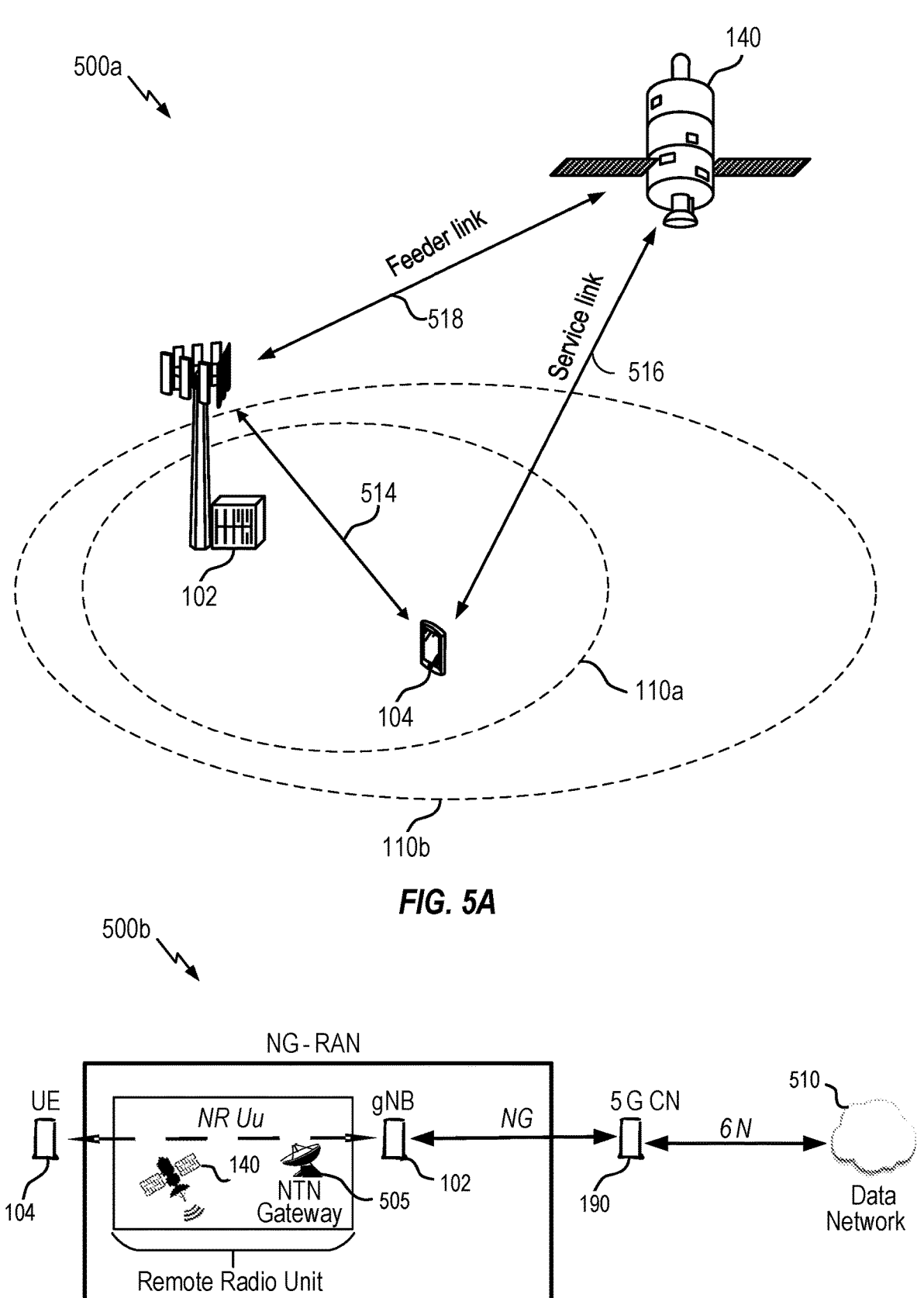
FIG. 5A depicts an example NTN.
FIG. 5B depicts an example NTN architecture.

FIG. 5A illustrates an example of a wireless communications network 500a including an NTN entity 140. In some examples, the wireless communications network 500a may implement aspects of the wireless communication network 100. For example, the wireless communications network 500a may include a ground station such as BS 102, a UE 104, and an NTN entity such as the satellite 140. BS 102 may serve a coverage area or cell 110a in cases of a terrestrial network, and NTN entity 140 may serve the coverage area 110b in cases of a non-terrestrial network. Some NTNs may employ airborne platforms (e.g., a drone or balloon) and/or space borne platforms (e.g., a satellite).

In some aspects, coverage area 110a may be considered a "normal coverage" area for UE 104. That is, it is expected that UE 104 will receive at least a minimum level of reception and have at least a minimum level of reception quality from the wireless communications network 500a. In some cases, the network may configure thresholds that define this minimum level, such that the UE is able to decode system information (SI) included in reference signals, referred to as synchronization signal blocks (SSBs).

Coverage area 110b may be considered an extended coverage area, also sometimes referred to herein as a deep coverage area, for UE 104. In the extended coverage area, it is expected that UE 104 will receive at least a minimum level of reception, that the threshold will be lower than for the normal coverage area. Similarly, it is expected that UE 104 will have at least a minimum level of reception quality from wireless communications network 500*a*, but the threshold will be lower than for normal coverage. In this way, in an extended coverage zone, UE 104 will have a degraded level of reception level and quality, as compared to a normal coverage zone. For example, in the extended coverage area a UE may be expected to detect SSBs, but may not be expected to decode SI from the SSBs. Outside of coverage area 110*b*, UE 104 may not receive any signals from wireless communications network 500*a*.

The NTN entity 140 may communicate with the BS 102 and UE 104 as part of wireless communications in an NTN. In cases of a terrestrial network, the UE 104 may communicate with the BS 102 over a communication link 514. In the case of NTN wireless communications, the NTN entity 140 may be a serving cell for the UE 104 via a communication link 516 referred to as a service link. In certain aspects, the NTN entity 140 may act as a relay (or a remote radio head) for the BS 102 and the UE 104. For example, the BS 102 may communicate with the NTN entity 140 via a communication link 518, and the NTN entity 140 may relay signaling between the BS 102 and UE 104 via the communication links 516, 518. The NTN entity 140 may communicate with a terrestrial gateway (e.g., a satellite dish) via a feeder link. The BS 102 may be co-located with a gateway, deployed behind the gateway, and/or deployed on the satellite 140.

An NTN beam may cover an area of 100 km to 1000 km for a LEO satellite and 200 km to 3500 km for a Geostationary orbit (GEO) satellite. As illustrated in FIG. 5B, an NG-RAN 500*b* deployment may include satellite 140 and NTN gateway (GW) 505 serving as the cellular Uu) link between a UE 104 and a terrestrial network (TN) gNB 102 (and the 5G core network 190). NG-RAN 500*b* generally represents radio access network for 5G and provides both NR and LTE radio access. The link between the UE 104 and satellite 140 is generally referred to as the service link, while the link between the satellite and GW is generally referred to as the feeder link.

In some aspects, the satellite 140 communicates with different UEs as it moves across its orbit. As the satellite orbits, it communicates with different UEs through different beams. Uplink signals from the UEs experience a round trip delay (RTD) that is generally a sum of the delay on the service link plus the delay on the feeder link. The maximum RTD is typically around 541.46 ms for GEO satellites, 25.77 ms for LEO satellites at 600 km altitude, and 41.77 ms for LEO satellites at 1200 km altitude. UE speed can typically be ignored in comparison with speed of LEO satellite.

When a satellite 140 moves and the UE 104 is outside of the coverage area 110*b* of the satellite 140 is referred to as discontinuous coverage. Further, when a satellite 140 may not have a feeder link connectivity to a ground station is referred to as intermittent coverage.

Aspects Related to Paging in Deep Coverage Scenarios

Aspects of the disclosure are related to techniques for paging a user equipment located in a limited (deep) coverage zone of a wireless communications network, such as wireless communications network 500*a* for FIG. 5.

As noted above, a wireless communications network may page a UE device for many reasons. In one example, illustrated in FIG. 6, a core network has downlink data to be delivered to the UE, for example an incoming call for the UE.

In conventional networks, if the UE has transitioned into an idle state with the network, then the network may be unable to find the UE to signal it directly. Thus, the core network may send a paging request to a group of RAN nodes belonging to the same tracking area as the UE. Each RAN node forwards the paging message over a physical channel (defined by a set of time and frequency resources). If the UE is able to decode the paging message, the UE responds to the paging message, performs service registration, and then is transitioned back into an RRC connected state. Then the UE can connect to the core network, and a full sequence for establishment of a call or data session can begin. Thus, a paging message is typically used by a network to reach a UE that is in an idle mode.

In some networks (such as NTN networks), an uplink link budget can be small, which can lead to an unstable paging channel. For a Mobile Originating (MO) call or session, a user is generally expected to move into a preferred location or attempt to minimize block, to improve the channel reception.

However, for a Mobile Terminating (MT) call or session, an uplink channel can be so weak that a response to a paging message from the RAN from the UE will not be received by the network. That is, the UE can be located in a deep coverage zone, so the link will not work properly, and the UE may not receive the downlink paging message from the RAN or, even if the UE does receive the paging message, the UE response may not be received by the network.

In some examples, a UE may be unable to receive a paging message (because it is located in a deep coverage zone that is geographically distant from a base station. In other examples, a UE may be unable to receive a paging message because it is obstructed, such as located in a pocket, backpack, or other physical barrier that prevents signals from passing through.

Figure 6:
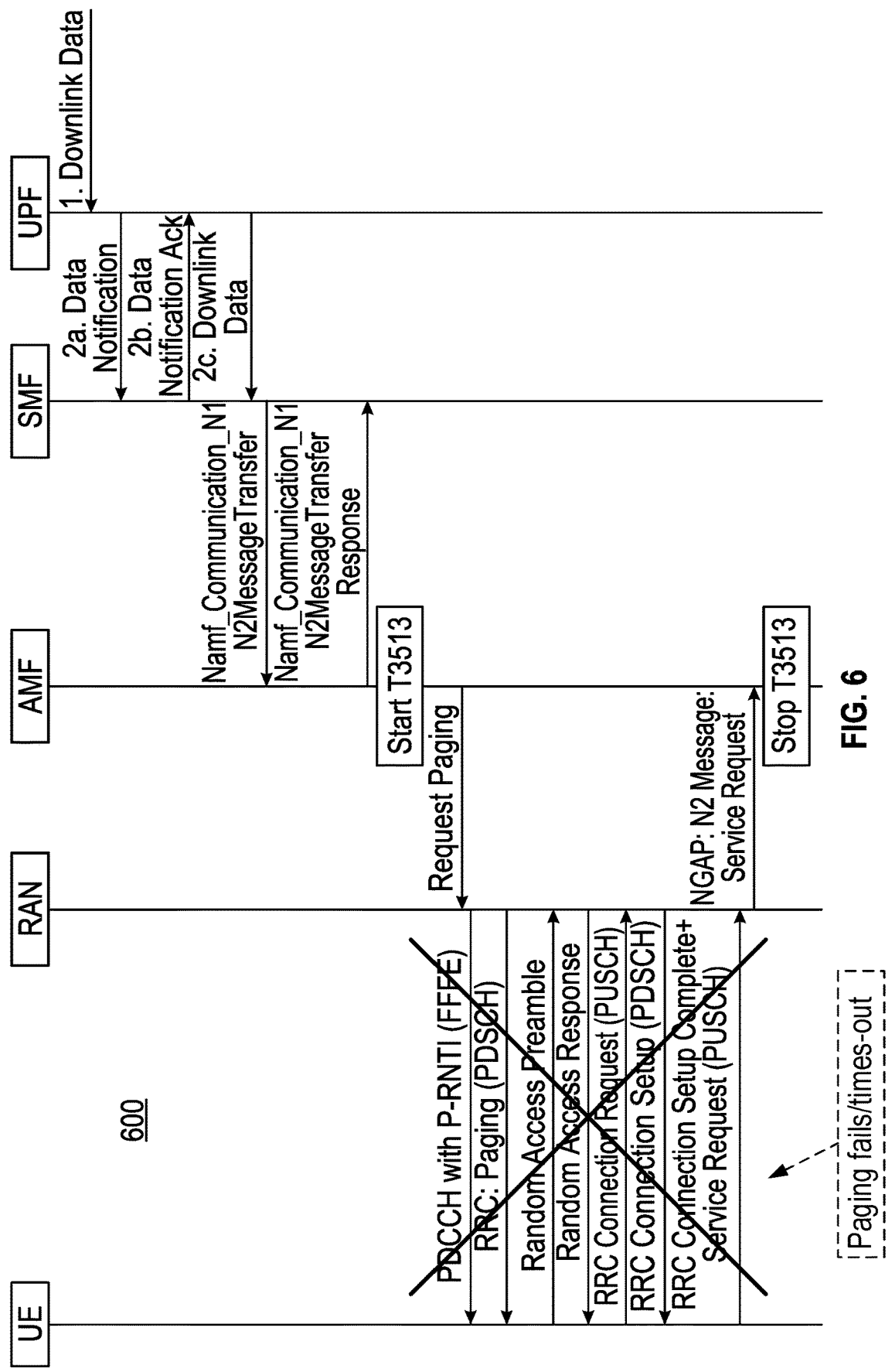
FIG. 6 depicts an example call flow diagram for a wireless communication network using legacy techniques.

FIG. 6 depicts an example call flow diagram 600 for a wireless communications network to page a UE using a conventional paging procedure. In example call flow 600 of FIG. 6, a UPF (User Plane Function) of a core network receives downlink data for a UE. The UPF then transmits a data notification to the SMF (Session Management Function) that it has downlink data for the UE. The SMF in turn transmits a data notification acknowledgement back to the UPF. Upon receipt of this acknowledgement, UPF transmits the downlink data to the SMF.

The SMF further transmits a message to the AMF (Access and Mobility Management Function) of the core network, which in turns sends a response back to the SMF. A session is then initiated and the AMF requests paging to the RAN. As illustrated, a timer may be started when the AMF sends the paging to the RAN, to effectively put a time limit on the paging procedure. The time limit may be set to provide sufficient time for the exchange of messages between the RAN and UE, while limiting how much time is spent in the event the UE is not reachable.

If the UE is located in a normal coverage zone of the RAN, then the RAN will be able to successfully page the UE and establish an RRC connection, before expiration of the timer. However, if the UE is located in an extended coverage zone, or a no coverage zone of the RAN, then the RAN may be unable to successfully reach the UE via its paging message or may be unable to receive the UE message(s) sent in response to the paging message. Call flow 600 depicts the example use case where the UE is unable to receive the paging message from the RAN, and is thus unable to complete the RRC connection setup (as indicated by the X through the paging related messages).

Aspects Related to Pre-Paging of a UE

Aspects of the present disclosure provide for a technique that may help a network reach a UE that is in an extended coverage zone (also sometimes referred to herein as a limited or deep coverage zone). Due to limited coverage, the UE may not be reachable by the network via normal paging.

As discussed herein, a UE may be in an extended coverage zone due to physical distance from a base station, or due to some other physical obstruction. In some aspects, a RAN that is unable to page a UE through a typical technique can instead implement a pre-paging technique to reach a UE via a same or different radio channel in the wireless communications network. The pre-paging technique proposed herein can be particularly useful for a NTN network.

In some aspects, a wireless communications network may signal a pre-paging configuration to a UE. The pre-paging configuration may indicate a set of time and frequency resources that the UE can monitor in order to detect and decode a pre-paging message. To reduce a chance of a false alarm, the pre-paging resources utilized by the wireless communications network may be orthogonalized in a time-frequency-code domain. For example, to ensure that only one UE decodes the pre-paging resource allocated to it, and not other UEs, different UEs may be assigned different sets of resources.

Figure 7:
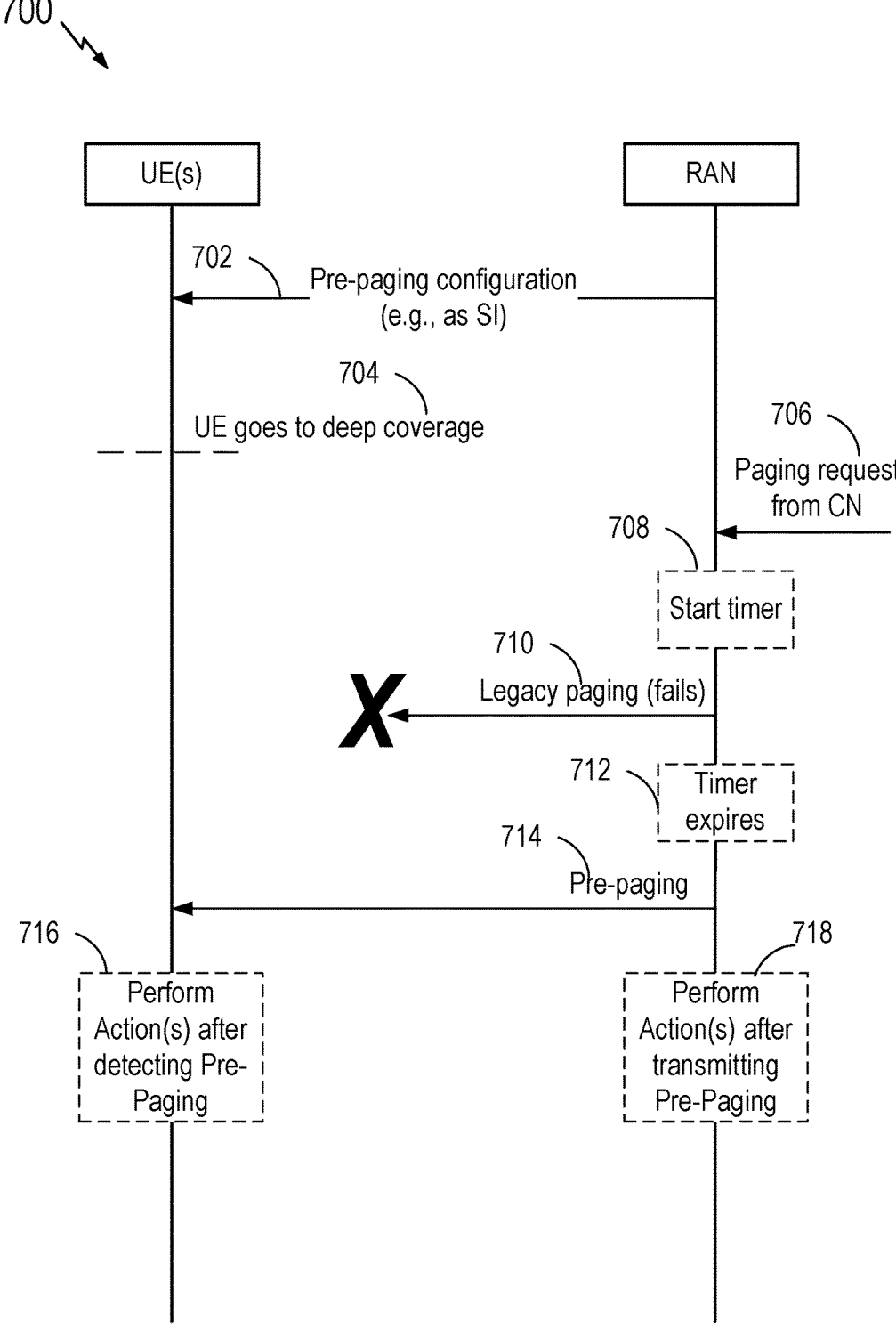
FIG. 7 depicts an example call flow diagram for a wireless communication network, in accordance with aspects of the present disclosure.

FIG. 7 depicts an example call flow diagram 700 for pre-paging a UE by a wireless communications network. In some aspects, the UE shown in FIG. 7 (and/or FIG. 8) may be an example of the UE 104 depicted and described with respect to FIGS. 1 and 3. In some aspects, the network entity (RAN) shown in FIG. 7 (and/or FIG. 8) may be an example of the BS 102 (e.g., a gNB) depicted and described with respect to FIGS. 1 and 3 or a disaggregated base station depicted and described with respect to FIG. 2.

At 702 of example call flow diagram 700, a RAN transmits a pre-paging configuration to the UE. The pre-paging configuration may indicate details effectively defining a pre-paging channel. For example, the pre-paging configuration may indicate time and frequency resources the UE may monitor for pre-paging when the UE is in limited coverage. In some cases, a UE may determine it is in a limited (deep/extended) coverage area based on threshold values for signal strength or quality. Such thresholds may be indicated as part of the pre-paging configuration.

In some aspects, a pre-paging configuration may be broadcast by the RAN as system information (SI) to the entire cell. A pre-paging configuration may be broadcast to the cell by the RAN in a SIB-1 message, as part of essential system information. Alternatively, a pre-paging configuration may be broadcast via a new SIB message. In general, the UE may receive the pre-paging configuration while located in a normal coverage zone of the wireless communications network (where signal strength is sufficient for SIB decoding).

In this example, a pre-paging search space is cell specific and configured as a common search space, thus utilizing a same time frequency resource for pre-paging. In this context, a search space may refer to the set of pre-paging decoding candidates a UE can monitor for (e.g., with each candidate defined by a set of time and frequency resources). Each UE in the cell may have a different identifier assigned to it, and this identifier may be used in a subsequent pre-paging message, allowing only the intended UE recipient of the pre-paging message to detect and decode the message, even though the configuration information was broadcast to all UEs in the cell.

Since pre-paging configuration is broadcast to all UEs in the cell, code domain orthogonalization may be used to separate UE-specific resources from the common resources. In some aspects, this is accomplished via an RNTI (Radio Network Temporary Identifier) for monitoring the pre-paging PDCCH (Physical Downlink Control Channel). That is, each UE monitors the control channel for a unique code or RNTI that is specific to that UE (e.g., with a checksum scrambled with the unique code or RNTI).

At 704 of example call flow diagram 700, the UE moves to a deep coverage zone of the wireless communications network. As noted above, in the deep coverage zone, the UE may not be reachable via conventional paging, though the RAN may attempt the conventional paging procedure before attempting pre-paging, as the RAN may not be aware that the UE is in deep coverage.

At 706, a paging request is received by the RAN from a core network. The RAN initiates a timer at 708, and attempts to page the UE via a legacy paging method at 710. Because the UE is in a deep coverage zone, it is not able to receive the legacy paging method, and the page fails (as indicated by the X).

Therefore, at 712, the timer expires and the RAN transmits a pre-paging message to the UE at 714 over a pre-paging physical channel. Since the UE was previously configured with resources to monitor for pre-paging messages, it is able to receive the pre-paging message from the RAN.

At 716, the UE may perform one or more actions after detection of the pre-paging message. For example, the UE may alert a user that there is a message or call via any mechanism such as a vibration, ring, pop-up notification, etc. Upon receiving this alert, the user may move the UE to a better location such that it can connect to the network and receive the message. In some aspects, the user moves the UE to a normal coverage zone of the wireless communications network.

At 718, the RAN may perform one or more actions after transmitting the pre-paging message. For example, the RAN may wait for an expected MO session. In another example, the RAN may wait for a predetermined period of time, and then repeat the legacy paging message if no response is received from the UE to the pre-paging message. In a further example, the RAN may wait for a predetermined period of time, and then repeat the pre-paging message if no response is received from the UE.

While not expressly depicted in FIG. 7, in some cases, a UE may signal to the RAN that it has the capability to accept pre-paging messages. UE capability may be determined by hardware requirements, or a pre-paging feature that a user may turn on or off on the UE. In some aspects, a pre-paging capability of a UE may be turned off when the UE enters into a power-saving mode. From the capability information, a network may determine a subset of UEs present in the cell that are candidates for pre-paging, and assign unique codes or RNTI to only those subset of UEs in the cell.

In some aspects, the capability signaling may be transmitted to the RAN before the RAN signals pre-paging configuration. In other aspects, the capability signaling may be transmitted to the RAN after the RAN signals pre-paging configuration. In either scenario, a network may assign a temporary RNTI for monitoring PDCCH during any phase of a UE being in an RRC connected state. Further, a dedicated DCI (Downlink Control Information) format may be reserved by the wireless communications network for pre-paging. In some aspects, the DCI is scrambled by the RNTI.

In further aspects, the network may assign a validity timer to each RNTI, and expunge the RNTI after expiry of the validity timer. In this way, the RNTI is only reserved for a predetermined period of time, and the RNTI can be reused for a second UE, if the first UE enters into an idle mode.

In other aspects where time-frequency resources are group common, UEs in a cell can be separated into multiple groups. A RAN can broadcast to the cell a group identifier and a unique RNTI code. In this technique, there are two levels of organization—an RNTI and a group identifier. In this way, groups each have their own time frequency resources, and also, within a group, time frequency resources are separated for each UE.

Figure 8:
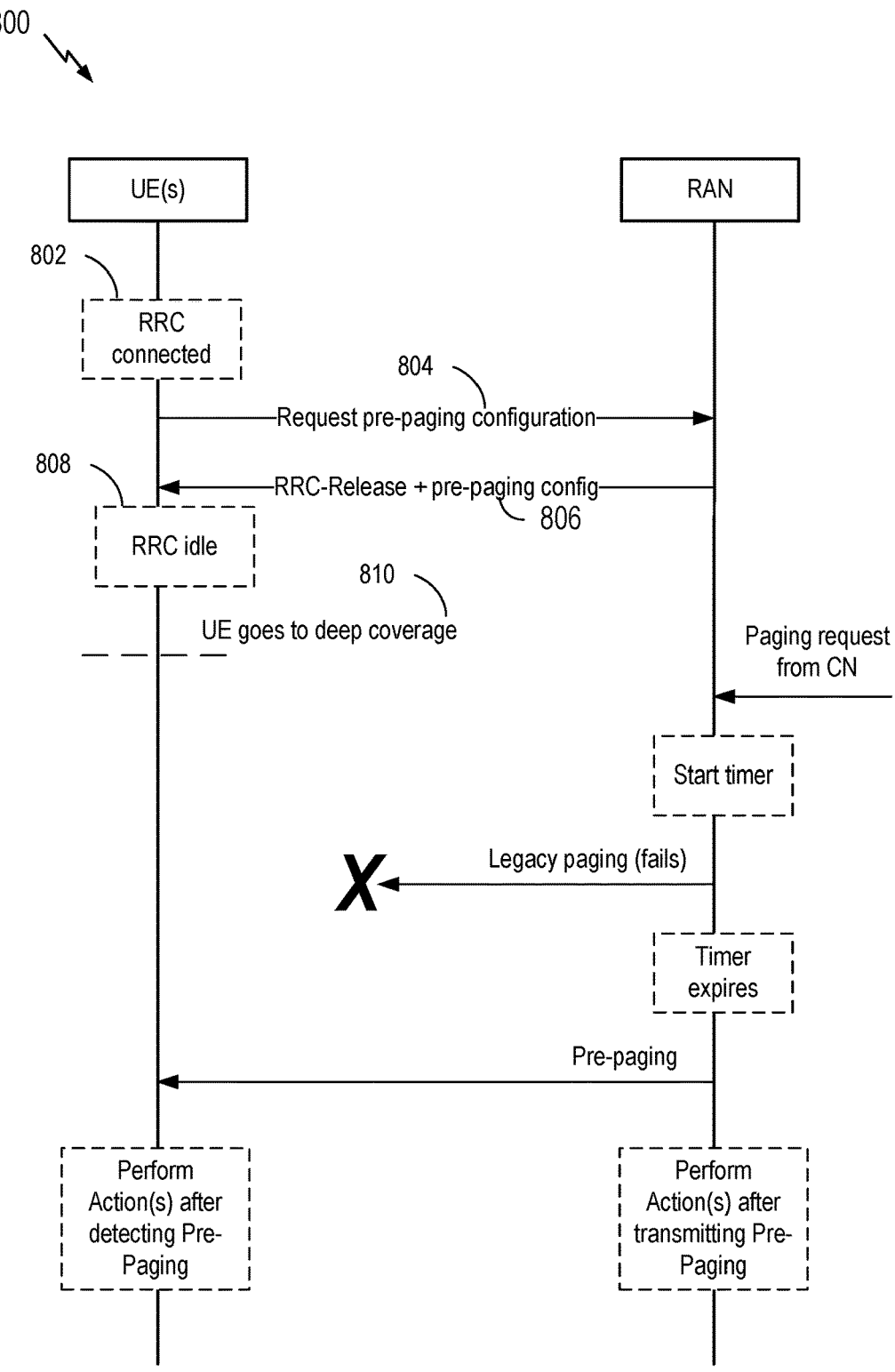
FIG. 8 depicts an example call flow diagram for a wireless communication network, in accordance with other aspects of the present disclosure.

In some cases, as an alternative to broadcasting pre-paging configuration, a UE may request a pre-paging configuration. FIG. 8 depicts another example call flow diagram 800 where a UE requests a pre-paging configuration.

At 802 of example call flow diagram 800, a UE establishes an RRC connection to a RAN of the wireless communications network, while in a normal coverage zone of the wireless communications network. At 804, the UE requests pre-paging configuration information from the RAN. This request may be conveyed in any suitable type of signaling (e.g., via UCI or MAC CE). At 806, the RAN transmits pre-paging configuration information. The pre-paging configuration information may be transmitted in any suitable UE dedicated signaling.

As such, a UE-specific pre-paging search space may be configured using dedicated time frequency resources for the pre-paging, since the UE is in an RRC connected mode. Thus, the network can provide a UE-specific pre-paging configuration to the UE, or a UE specific pre-paging search space. Since it is UE-specific, the network is orthogonalizing the UEs over time and frequency. As illustrated, in some cases, the pre-paging configuration may be conveyed in an RRC release message.

While not expressly depicted in FIG. 8, a UE may also signal capability to the RAN for accepting pre-paging. In some aspects, the capability signaling may be transmitted to the RAN prior to, concurrent with, or subsequent to requesting the pre-paging configuration from the RAN.

Sometime later, the UE transitions to an RRC idle mode at 808. Subsequently, the UE moves to a deep coverage zone of the wireless communications network at 810. While the UE is in the deep coverage zone, the RAN receives the paging (or pre-paging) request from a core network, and performs the same actions as discussed above with respect to FIG. 7.

As discussed above, in example call flow diagram 800 of FIG. 8, the pre-paging configuration is UE specific (whereas the pre-paging configuration is cell specific in example call flow diagram 700 of FIG. 7). For call flow diagram 800, the RAN provides the pre-paging configuration to the UE while the UE is in an RRC connected mode, and then releases the UE when transitions to an idle mode.

While in idle mode, a UE may perform cell reselection as it tries to camp on the cell with the best signal quality and strength. However, if the UE camp on a different cell than the one from which it received the pre-paging configuration, then the previous pre-paging configuration will be invalid for the UE. This may occur if a UE is moving at a great speed after it goes into a deep coverage zone. Further, in the case of an NTN network, a UE may reselect in idle mode to a different satellite or different beam of a same satellite, even if the UE itself is static.

To address this, the present disclosure provides for techniques to configure a UE for pre-paging by any one of a group of cells. When the RAN transmits pre-paging configuration information at 806 of example call flow diagram 800, it can indicate a list of objects in the pre-paging configuration message, which may be indexed by a cell ID.

Each object may have a set of parameters for the UE to monitor the pre-paging channel in that particular cell.

In some cases, the RAN may predict how many cell IDs are needed to configure the UE, such that it provides that information in the pre-paging configuration to the UE. In this way, the UE can continue to be configured for pre-paging even if it re-selects a different cell in the future, because a part of the pre-paging configuration (e.g., a code such as an RNTI or a group ID+RNTI) is valid across multiple cells.

In some aspects, RAN nodes may exchange the code over an interface (e.g., a XNAP interface), so each of the cells have the same configuration information. In other aspects, RAN nodes in a same tracking area may maintain a common pool of resources from which to assign these unique codes to the respective UEs when the UEs are released from an RRC connection with the cell. In this way, a pool of codes (such as RNTI) may be valid across the multiple RAN nodes of a same tracking area, to ensure that a pre-paging configuration generated by a RAN node is valid across these multiple cells.

When a RAN node provides pre-paging configuration to the UE, it provides the UE with multiple time frequency resources which are valid across multiple cells. Thus, even if a UE re-selects a different cell while it is in idle mode, the UE can continue to monitor for pre-paging using a same code. The code may further be associated with a validity timer. Upon expiration of the timer, the code may be released and the UE may need to be re-configured for monitoring of pre-paging messages.

Figure 9:
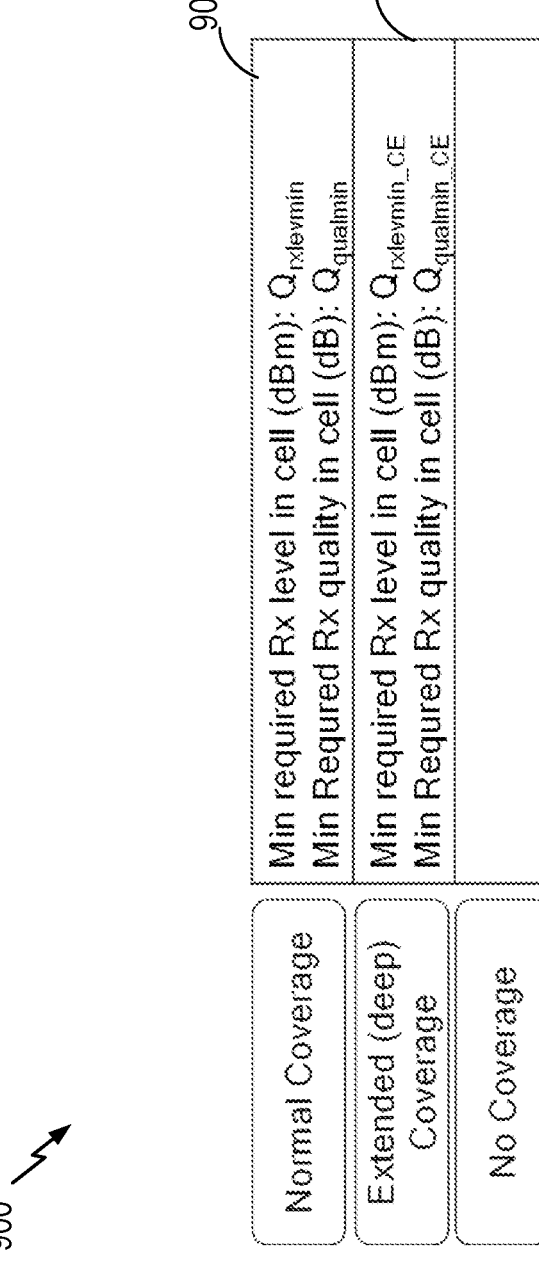
FIG. 9 depicts an example chart of coverage zones of a wireless communication network.

FIG. 9 depicts an example chart 900 of signal strength/ quality thresholds that may effectively define different coverage zones for a wireless communications network.

When a UE is able to receive a minimum level of a signal (represented by the variable $Q_{rxlevmin}$), and/or receive a minimum quality of a signal (represented by the variable $Q_{qualmin}$), then the UE may be considered to be in a normal coverage zone of a wireless communications network, per 902 of chart 900. When a UE is able to only receive a minimum level of a signal $Q_{rxlevmin\_CE}$, and/or only able to receive a minimum quality of a signal $Q_{qualmin\_CE}$, then the UE may be considered to be in a deep coverage zone of a wireless communications network, per 904 of chart 900. In some embodiments, a RAN may indicate these sets of parameters to a UE over a system information message, such as SIB-1. If neither of these sets of parameters are met, then the UE may be considered to be in a no coverage zone.

A UE can be categorized as being in a deep coverage zone if there is no cell with: a received signal level Srxlev greater than $Q_{rxlevmin}$, and a received signal quality Squal greater than $Q_{qualmin}$. Further, there is at least one cell with a received signal level Srxlev greater than $Q_{rxlevmin\_CE}$, and a received signal quality Squal greater than $Q_{qualmin\_CE}$. If these parameters are met, then the UE is able to detect an SSB (Synchronization Signal Block), but not able to decode a SIB (System Information Block) from the RAN.

In aspects of the present disclosure, a UE uses the parameters from chart 900 to determine which coverage zone it is located in, and monitor the appropriate channel. That is, if a UE determines that it is located in a normal coverage zone, then it may monitor a first channel for a legacy paging message. However, if a UE determines that is located in a deep coverage zone, then it may monitor a second channel search space for a pre-paging message.

If a UE determines that it is in a deep coverage zone, and it has pre-paging configuration for more than one cell, then the UE may create a list of cell IDs and determine an intersection between the detected cells and the cell IDs for which the UE has pre-paging configuration. The UE may prioritize the cell IDs for pre-paging monitoring in a spec-defined way (e.g. best cell in intra-freq. range first, explicit priority order configured by network), or other mechanism.

Example Operations

FIG. 10 shows an example of a method 1000 of wireless communications at a user equipment (UE), such as a UE 104 of FIGS. 1 and 3.

Method 1000 begins at step 1005 with receiving signaling configuring the UE with a first set of resources for monitoring for paging message and a second set of resources for monitoring for pre-paging messages. In some cases, the operations of this step refer to, or may be performed by, circuitry for receiving and/or code for receiving as described with reference to FIG. 12.

Method 1000 then proceeds to step 1010 with monitoring the second set of resources for a pre-paging message if one or more conditions are met. In some cases, the operations of this step refer to, or may be performed by, circuitry for monitoring and/or code for monitoring as described with reference to FIG. 12.

Method 1000 then proceeds to step 1015 with performing one or more actions in response to detecting a pre-paging message. In some cases, the operations of this step refer to, or may be performed by, circuitry for performing and/or code for performing as described with reference to FIG. 12.

In some aspects, the one or more actions comprise: monitoring the first set of resources for a paging message.

In some aspects, the one or more actions comprise: providing a notification to a user.

In some aspects, the UE is able to select whether to monitor the first set of resources for a paging message or monitor the second set of resources for a pre-paging message; and the one or more conditions are met if the UE selects to monitor the second set of resources for a pre-paging message.

In some aspects, the method 1000 further includes transmitting an indication of at least one of a capability of the UE to monitor for pre-paging messages, or that monitoring for pre-paging is enabled at the UE. In some cases, the operations of this step refer to, or may be performed by, circuitry for transmitting and/or code for transmitting as described with reference to FIG. 12.

In some aspects, the signaling configuring the UE with the second set of resources comprises system information.

In some aspects, the signaling configuring the UE with the second set of resources comprises radio resource control (RRC) signaling.

In some aspects, the RRC signaling configures the UE with a radio network temporary identifier (RNTI) used for monitoring for pre-paging messages.

In some aspects, the RRC signaling also configures the UE with a validity timer associated with the RNTI.

In some aspects, the second set of resources are group common and the RNTI is UE-specific.

In some aspects, the signaling configuring the UE with the second set of resources indicates a pre-paging configuration that is valid over multiple cells.

In some aspects, one or more of the multiple cells comprise non-terrestrial network (NTN) cells.

In some aspects, the one or more conditions comprise a first condition that, if met, indicates the UE is in extended coverage in at least one cell.

In some aspects, the first condition is met if a parameter indicative of a receive signal level or quality exceeds a threshold.

In some aspects, the UE is configured with different thresholds that indicate whether the UE is in extended coverage or normal coverage in a cell.

In some aspects, if first condition indicates the UE is in extended coverage in multiple cells, the method further comprises deciding at least one of: in which of the multiple cells the UE will monitor for pre-paging messages; or in what order the UE will monitor for pre-paging messages in one or more of the multiple cells.

Figure 12:
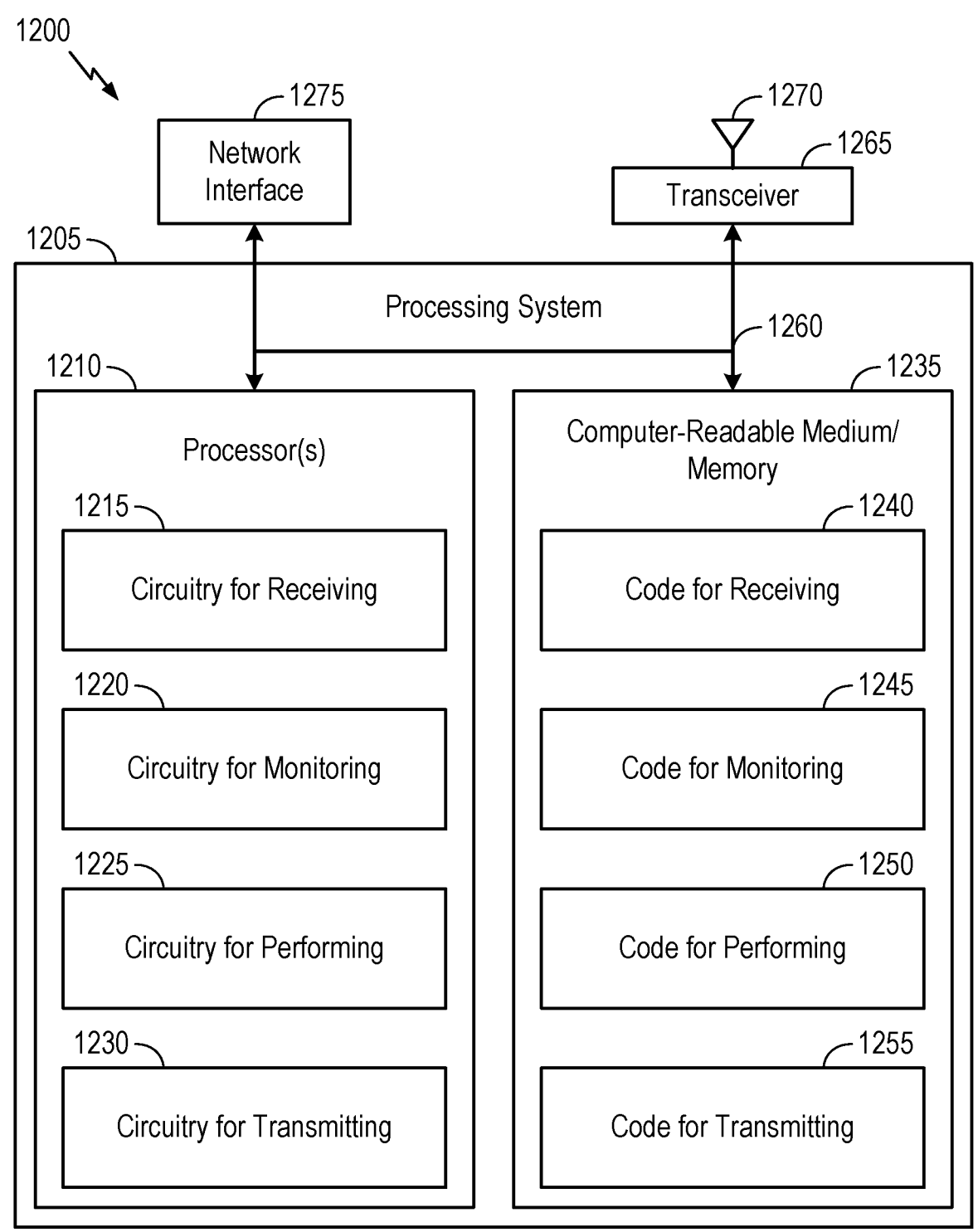
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

FIG. 11 shows an example of a method 1100 of wireless communications at a network entity, such as a BS 102 of FIGS. 1 and 3, or a disaggregated base station as discussed with respect to FIG. 2.

Method 1100 begins at step 1105 with transmitting a pre-paging message to a user equipment (UE) on a second set of resources if one or more conditions are met, wherein the second set of resources is different than a first set of resources for transmitting a paging message to the UE. In some cases, the operations of this step refer to, or may be performed by, circuitry for transmitting and/or code for transmitting as described with reference to FIG. 12.

Method 1100 then proceeds to step 1110 with performing one or more actions after transmitting the pre-paging message. In some cases, the operations of this step refer to, or may be performed by, circuitry for performing and/or code for performing as described with reference to FIG. 12.

In some aspects, the one or more conditions comprise: expiration of a timer without receiving a response to a paging message sent on the first set of resources.

In some aspects, the one or more conditions comprise: receiving an indication, from a core network (CN) node, that the network entity is to page the UE via a pre-paging message on the second set of resources.

In some aspects, the one or more actions comprise: transmitting a paging message to the UE on the first set of resources.

In some aspects, the method 1100 further includes receiving an indication of at least one of a capability of the UE to monitor for pre-paging messages, or that monitoring for pre-paging is enabled at the UE. In some cases, the operations of this step refer to, or may be performed by, circuitry for receiving and/or code for receiving as described with reference to FIG. 12.

In some aspects, the method 1100 further includes transmitting signaling configuring the UE with the second set of resources. In some cases, the operations of this step refer to, or may be performed by, circuitry for transmitting and/or code for transmitting as described with reference to FIG. 12.

In some aspects, the signaling configuring the UE with the second set of resources comprises system information.

In some aspects, the signaling configuring the UE with the second set of resources comprises radio resource control (RRC) signaling.

In some aspects, the RRC signaling configures the UE with a radio network temporary identifier (RNTI) used for monitoring for pre-paging messages.

In some aspects, the RRC signaling also configures the UE with a validity timer associated with the RNTI.

In some aspects, the second set of resources are group common and the RNTI is UE-specific.

In some aspects, the signaling configuring the UE with the second set of resources indicates a pre-paging configuration that is valid over multiple cells.

In some aspects, one or more of the multiple cells comprise non-terrestrial network (NTN) cells.

In some aspects, the method 1100 further includes transmitting signaling configuring the UE with different thresholds that indicate whether the UE is in extended coverage or normal coverage in a cell. In some cases, the operations of this step refer to, or may be performed by, circuitry for transmitting and/or code for transmitting as described with reference to FIG. 12.

In one aspect, method 1100, or any aspect related to it, may be performed by an apparatus, such as communications device 1200 of FIG. 12, which includes various components operable, configured, or adapted to perform the method 1100. Communications device 1200 is described below in further detail.

Note that FIG. 11 is just one example of a method, and other methods including fewer, additional, or alternative steps are possible consistent with this disclosure.

Example Communications Device(s)

FIG. 12 depicts aspects of an example communications device 1200. In some aspects, communications device 1200 is a user equipment, such as UE 104 described above with respect to FIGS. 1 and 3. In some aspects, communications device 1200 is a network entity, such as BS 102 of FIGS. 1 and 3, or a disaggregated base station as discussed with respect to FIG. 2.

The communications device 1200 includes a processing system 1205 coupled to the transceiver 1265 (e.g., a transmitter and/or a receiver). In some aspects (e.g., when communications device 1200 is a network entity), processing system 1205 may be coupled to a network interface 1275 that is configured to obtain and send signals for the communications device 1200 via communication link(s), such as a backhaul link, midhaul link, and/or fronthaul link as described herein, such as with respect to FIG. 2. The transceiver 1265 is configured to transmit and receive signals for the communications device 1200 via the antenna 1270, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. In various aspects, one or more processors 1210 may be representative of one or more of receive processor 338, transmit processor 320, TX MIMO processor 330, and/or controller/processor 340, as described with respect to FIG. 3. The one or more processors 1210 are coupled to a computer-readable medium/memory 1235 via a bus 1260. In certain aspects, the computer-readable medium/memory 1235 is configured to store instructions (e.g., computer-executable code) that when executed by the one or more processors 1210, cause the one or more processors 1210 to perform the method 1000 described with respect to FIG. 10, or any aspect related to it; and the method 1100 described with respect to FIG. 11, or any aspect related to it. Note that reference to a processor performing a function of communications device 1200 may include one or more processors 1210 performing that function of communications device 1200.

In the depicted example, computer-readable medium/memory 1235 stores code (e.g., executable instructions), such as code for receiving 1240, code for monitoring 1245, code for performing 1250, and code for transmitting 1255. Processing of the code for receiving 1240, code for monitoring 1245, code for performing 1250, and code for transmitting 1255 may cause the communications device 1200 to perform the method 1000 described with respect to FIG. 10, or any aspect related to it; and the method 1100 described with respect to FIG. 11, or any aspect related to it.

The one or more processors 1210 include circuitry configured to implement (e.g., execute) the code stored in the computer-readable medium/memory 1235, including circuitry for receiving 1215, circuitry for monitoring 1220, circuitry for performing 1225, and circuitry for transmitting 1230. Processing with circuitry for receiving 1215, circuitry for monitoring 1220, circuitry for performing 1225, and circuitry for transmitting 1230 may cause the communications device 1200 to perform the method 1000 described with respect to FIG. 10, or any aspect related to it; and the method 1100 described with respect to FIG. 11, or any aspect related to it.

Various components of the communications device 1200 may provide means for performing the method 1000 described with respect to FIG. 10, or any aspect related to it; and the method 1100 described with respect to FIG. 11, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1265 and the antenna 1270 of the communications device 1200 in FIG. 12. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1265 and the antenna 1270 of the communications device 1200 in FIG. 12.

Example Clauses

Implementation examples are described in the following numbered clauses:

Clause 1: A method for wireless communications at a user equipment (UE), comprising: receiving signaling configuring the UE with a first set of resources for monitoring for paging message and a second set of resources for monitoring for pre-paging messages; monitoring the second set of resources for a pre-paging message if one or more conditions are met; and performing one or more actions in response to detecting a pre-paging message.

Clause 2: The method of Clause 1, wherein the one or more actions comprise: monitoring the first set of resources for a paging message.

Clause 3: The method of any one of Clauses 1-2, wherein the one or more actions comprise: providing a notification to a user.

Clause 4: The method of any one of Clauses 1-3, wherein: the UE is able to select whether to monitor the first set of resources for a paging message or monitor the second set of resources for a pre-paging message; and the one or more conditions are met if the UE selects to monitor the second set of resources for a pre-paging message.

Clause 5: The method of any one of Clauses 1-4, further comprising transmitting an indication of at least one of a capability of the UE to monitor for pre-paging messages, or that monitoring for pre-paging is enabled at the UE.

Clause 6: The method of any one of Clauses 1-5, wherein the signaling configuring the UE with the second set of resources comprises system information.

Clause 7: The method of any one of Clauses 1-6, wherein the signaling configuring the UE with the second set of resources comprises radio resource control (RRC) signaling.

Clause 8: The method of Clause 7, wherein the RRC signaling configures the UE with a radio network temporary identifier (RNTI) used for monitoring for pre-paging messages.

Clause 9: The method of Clause 8, wherein the RRC signaling also configures the UE with a validity timer associated with the RNTI.

Clause 10: The method of Clause 8, wherein the second set of resources are group common and the RNTI is UE-specific.

Clause 11: The method of any one of Clauses 1-10, wherein the signaling configuring the UE with the second set of resources indicates a pre-paging configuration that is valid over multiple cells.

Clause 12: The method of Clause 11, wherein one or more of the multiple cells comprise non-terrestrial network (NTN) cells.

Clause 13: The method of any one of Clauses 1-12, wherein the one or more conditions comprise a first condition that, if met, indicates the UE is in extended coverage in at least one cell.

Clause 14: The method of Clause 13, wherein the first condition is met if a parameter indicative of a receive signal level or quality exceeds a threshold.

Clause 15: The method of Clause 14, wherein the UE is configured with different thresholds that indicate whether the UE is in extended coverage or normal coverage in a cell.

Clause 16: The method of Clause 13 wherein, if first condition indicates the UE is in extended coverage in multiple cells, the method further comprises deciding at least one of: in which of the multiple cells the UE will monitor for pre-paging messages; or in what order the UE will monitor for pre-paging messages in one or more of the multiple cells.

Clause 17: A method for wireless communications at a network entity, comprising: transmitting a pre-paging message to a user equipment (UE) on a second set of resources if one or more conditions are met, wherein the second set of resources is different than a first set of resources for transmitting a paging message to the UE; and performing one or more actions after transmitting the pre-paging message.

Clause 18: The method of Clause 17, wherein the one or more conditions comprise: expiration of a timer without receiving a response to a paging message sent on the first set of resources.

Clause 19: The method of any one of Clauses 17-18, wherein the one or more conditions comprise: receiving an indication, from a core network (CN) node, that the network entity is to page the UE via a pre-paging message on the second set of resources.

Clause 20: The method of any one of Clauses 17-19, wherein the one or more actions comprise: transmitting a paging message to the UE on the first set of resources.

Clause 21: The method of any one of Clauses 17-20, further comprising receiving an indication of at least one of a capability of the UE to monitor for pre-paging messages, or that monitoring for pre-paging is enabled at the UE.

Clause 22: The method of any one of Clauses 17-21, further comprising transmitting signaling configuring the UE with the second set of resources.

Clause 23: The method of Clause 22, wherein the signaling configuring the UE with the second set of resources comprises system information.

Clause 24: The method of Clause 22, wherein the signaling configuring the UE with the second set of resources comprises radio resource control (RRC) signaling.

Clause 25: The method of Clause 24, wherein the RRC signaling configures the UE with a radio network temporary identifier (RNTI) used for monitoring for pre-paging messages.

Clause 26: The method of Clause 25, wherein the RRC signaling also configures the UE with a validity timer associated with the RNTI.

Clause 27: The method of Clause 25, wherein the second set of resources are group common and the RNTI is UE-specific.

Clause 28: The method of Clause 22, wherein the signaling configuring the UE with the second set of resources indicates a pre-paging configuration that is valid over multiple cells.

Clause 29: The method of Clause 28, wherein one or more of the multiple cells comprise non-terrestrial network (NTN) cells.

Clause 30: The method of any one of Clauses 17-29, further comprising transmitting signaling configuring the UE with different thresholds that indicate whether the UE is in extended coverage or normal coverage in a cell.

Clause 31: An apparatus, comprising: a memory comprising executable instructions; and a processor configured to execute the executable instructions and cause the apparatus to perform a method in accordance with any one of Clauses 1-30.

Clause 32: An apparatus, comprising means for performing a method in accordance with any one of Clauses 1-30.

Clause 33: A non-transitory computer-readable medium comprising executable instructions that, when executed by a processor of an apparatus, cause the apparatus to perform a method in accordance with any one of Clauses 1-30.

Clause 34: A computer program product embodied on a computer-readable storage medium comprising code for performing a method in accordance with any one of Clauses 1-30.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), comprising: at least one memory comprising computer-executable instructions; and one or more processors configured to execute the computer-executable instructions and cause the UE to:
   receive signaling configuring the UE with a first set of resources for monitoring for a paging message and a second set of resources for monitoring for pre-paging messages, wherein the second set of resources comprises a search space that includes a set of pre-paging decoding candidates;
   monitor the second set of resources for a pre-paging message conveyed via one of the pre-paging decoding candidates if one or more conditions are met that indicate the UE is in extended coverage in at least one cell; and
   perform one or more actions in response to detecting a pre-paging message.

2. The apparatus of claim 1, wherein the one or more actions comprise:
   monitoring the first set of resources for a paging message.

3. The apparatus of claim 1, wherein the one or more actions comprise:
   providing a notification to a user.

4. The apparatus of claim 1, wherein the search space is specific to the UE.

5. The apparatus of claim 1, wherein the one or more processors are further configured to execute the computer-executable instructions and cause the UE to transmit an indication of at least one of:
   a capability of the UE to monitor for pre-paging messages; or
   that monitoring for pre-paging is enabled at the UE.

6. The apparatus of claim 1, wherein the signaling configuring the UE with the second set of resources comprises system information or radio resource control (RRC) signaling.

7. The apparatus of claim 6, wherein the RRC signaling configures the UE with a radio network temporary identifier (RNTI) used for monitoring for pre-paging messages.

8. The apparatus of claim 7, wherein the RRC signaling also configures the UE with a validity timer associated with the RNTI.

9. The apparatus of claim 7, wherein the second set of resources are group common and the RNTI is UE-specific.

10. The apparatus of claim 1, wherein the signaling configuring the UE with the second set of resources indicates a pre-paging configuration that is valid over multiple cells.

11. The apparatus of claim 10, wherein one or more of the multiple cells comprise non-terrestrial network (NTN) cells.

12. The apparatus of claim 1, wherein the one or more conditions comprise a first condition that is considered met if a parameter indicative of a receive signal level or quality exceeds a threshold.

13. The apparatus of claim 12, wherein the UE is configured with different thresholds that indicate whether the UE is in extended coverage or normal coverage in a cell.

14. The apparatus of claim 1, wherein, if the one or more conditions indicate the UE is in extended coverage in multiple cells, the one or more processors are further configured to execute the computer-executable instructions and cause the UE to decide at least one of:

in which of the multiple cells the UE will monitor for pre-paging messages; or in what order the UE will monitor for pre-paging messages in one or more of the multiple cells.

15. An apparatus for wireless communication at a network entity, comprising: at least one memory comprising computer-executable instructions; and one or more processors configured to execute the computer-executable instructions and cause the network entity to:

transmit a pre-paging message to a user equipment (UE) on a second set of resources if one or more conditions are met that indicate the UE is in extended coverage, wherein the second set of resources is different than a first set of resources for transmitting a paging message to the UE and comprises a search space that includes a set of pre-paging decoding candidates; and perform one or more actions after transmitting the pre-paging message via one of the pre-paging decoding candidates.

16. The apparatus of claim 15, wherein the one or more conditions comprise:

expiration of a timer without receiving a response to a paging message sent on the first set of resources.

17. The apparatus of claim 15, wherein the one or more conditions comprise:

receiving an indication, from a core network (CN) node, that the network entity is to page the UE via a pre-paging message on the second set of resources.

18. The apparatus of claim 15, wherein the one or more actions comprise:

transmitting a paging message to the UE on the first set of resources.

19. The apparatus of claim 15, wherein the one or more processors are further configured to execute the computer-executable instructions and cause the network entity to receive an indication of at least one of:

a capability of the UE to monitor for pre-paging messages; or that monitoring for pre-paging is enabled at the UE.

20. The apparatus of claim 15, wherein the one or more processors are further configured to execute the computer-executable instructions and cause the network entity to transmit signaling configuring the UE with the second set of resources.

21. The apparatus of claim 20, wherein the signaling configuring the UE with the second set of resources comprises system information or radio resource control (RRC) signaling.

22. The apparatus of claim 21, wherein the RRC signaling configures the UE with a radio network temporary identifier (RNTI) used for monitoring for pre-paging messages.

23. The apparatus of claim 22, wherein the RRC signaling also configures the UE with a validity timer associated with the RNTI.

24. The apparatus of claim 22, wherein the second set of resources are group common and the RNTI is UE-specific.

25. The apparatus of claim 20, wherein the signaling configuring the UE with the second set of resources indicates a pre-paging configuration that is valid over multiple cells.

26. The apparatus of claim 25, wherein one or more of the multiple cells comprise non-terrestrial network (NTN) cells.

27. The apparatus of claim 15, wherein the one or more processors are further configured to execute the computer-executable instructions and cause the network entity to transmit signaling configuring the UE with different thresholds that indicate whether the UE is in extended coverage or normal coverage in a cell.

28. A method for wireless communications at a user equipment (UE), comprising:

receiving signaling configuring the UE with a first set of resources for monitoring for a paging message and a second set of resources for monitoring for pre-paging messages, wherein the second set of resources comprises a search space that includes a set of pre-paging decoding candidates;

monitoring the second set of resources for a pre-paging message conveyed via one of the pre-paging decoding candidates if one or more conditions are met that indicate the UE is in extended coverage in at least one cell; and performing one or more actions in response to detecting a pre-paging message.

29. A method for wireless communications at a network entity, comprising:

transmitting a pre-paging message to a user equipment (UE) on a second set of resources if one or more conditions are met that indicate the UE is in extended coverage, wherein the second set of resources is different than a first set of resources for transmitting a paging message to the UE and comprises a search space that includes a set of pre-paging decoding candidates; and performing one or more actions after transmitting the pre-paging message via one of the pre-paging decoding candidates.

* * * * *